US012587251B2

(12) United States Patent
Nakayama et al.

(10) Patent No.: US 12,587,251 B2
(45) Date of Patent: Mar. 24, 2026

(54) ESTIMATION METHOD AND ESTIMATION DEVICE

(71) Applicant: Panasonic Intellectual Property Management Co., Ltd., Osaka (JP)

(72) Inventors: Takeshi Nakayama, Hyogo (JP); Shoichi Iizuka, Osaka (JP); Naoki Honma, Iwate (JP); Abudusaimi Abuduaini, Iwate (JP); Nobuyuki Shiraki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 347 days.

(21) Appl. No.: 18/572,093

(22) PCT Filed: Jun. 8, 2022

(86) PCT No.: PCT/JP2022/023087
§ 371 (c)(1),
(2) Date: Dec. 19, 2023

(87) PCT Pub. No.: WO2023/276592
PCT Pub. Date: Jan. 5, 2023

(65) Prior Publication Data
US 2024/0283511 A1      Aug. 22, 2024

(30) Foreign Application Priority Data

Jun. 29, 2021      (JP) ................................. 2021-108202

(51) Int. Cl.
*H04B 7/06*          (2006.01)
*H04B 7/08*          (2006.01)
(Continued)

(52) U.S. Cl.
CPC ........... *H04B 7/0626* (2013.01); *H04B 7/086* (2013.01); *H04L 5/0007* (2013.01); *H04L 25/0248* (2013.01)

(58) Field of Classification Search
CPC ..... H04B 7/0626; H04B 7/086; H04L 5/0007; H04L 25/0248; G01S 7/411; G01S 13/42; G01S 7/415
See application file for complete search history.

(56) References Cited

U.S. PATENT DOCUMENTS

2017/0205502 A1      7/2017  Honma et al.
2018/0192919 A1*    7/2018  Nakayama ............ A61B 5/1116
(Continued)

FOREIGN PATENT DOCUMENTS

EP          3508871 A1 *  7/2019   ............. G01S 13/88
JP       2011-019845 A      2/2011
(Continued)

OTHER PUBLICATIONS

Estimating Living-Body Location Using Bistatic MIMO Radar in Multi-Path Environment; IEICE Trans. Commun., vol. E98-B, No. Nov. 11, 2015; Keita Konno, Naoki Honma Member, Dai Sasakawa, Kentaro Nishimori, Nobuyasu Takemura Tsotoma Mitsui and Yoshitaka Tsun (Year: 2015).*
(Continued)

*Primary Examiner* — Deepa Belur
(74) *Attorney, Agent, or Firm* — Rimon P.C.

(57)          ABSTRACT
An estimation method includes: transmitting first transmission signal from one of M first antenna elements of first radio; observing, by N second antenna elements of second radio, first reception signal including reflection signal of first transmission signal from living body; transmitting second transmission signal from one of N second antenna elements; observing second reception signal including reflection signal
(Continued)

of second transmission signal from living body; calculating first combined complex transfer function representing propagation characteristics between M first antenna elements and N second antenna elements; calculating second combined complex transfer function by calculation on first combined complex transfer function to reduce effects of clock frequency error and power error between first radio and second radio; extracting biological information of predetermined frequency range corresponding to component related to living body in second combined complex transfer functions; and estimating direction or location of living body using biological information.

17 Claims, 10 Drawing Sheets

(51) Int. Cl.
  *H04L 5/00*          (2006.01)
  *H04L 25/02*         (2006.01)

(56)                  References Cited

U.S. PATENT DOCUMENTS

| | | | | |
|---|---|---|---|---|
| 2019/0195997 | A1 * | 6/2019 | Iizuka | G06M 11/00 |
| 2020/0011967 | A1 * | 1/2020 | Iizuka | G01S 13/68 |
| 2020/0166622 | A1 * | 5/2020 | Small | G01S 13/4454 |
| 2020/0209351 | A1 | 7/2020 | Nakayama et al. | |
| 2020/0209379 | A1 * | 7/2020 | Iizuka | G01S 13/04 |

FOREIGN PATENT DOCUMENTS

| | | | | |
|---|---|---|---|---|
| JP | 2014-216786 A | 11/2014 | | |
| JP | 2015-072173 A | 4/2015 | | |
| JP | 2017-129558 A | 7/2017 | | |
| JP | 2020-109389 A | 7/2020 | | |
| WO | WO-2016025323 A1 * | 2/2016 | | A61M 5/00 |

OTHER PUBLICATIONS

International Search Report dated Aug. 2, 2022 issued in International Patent Application No. PCT/JP2022/023087, with English translation.
Extended European Search Report dated Sep. 11, 2024 for the counterpart European patent application No. 22832749.0.
Konno Keita et al: "Estimating Living-Body Location Using Bistatic MIMO Radar in Multi-Path Environment", IEICE Transaction on Communication, vol. E98.B, No. 11, Nov. 2015 (Nov. 2015), pp. 2314-2321, XP093185068.

* cited by examiner

FULL MIMO

SP4T : Single-Pole 4 Throw
SG : Signal Generator
LNA : Low-Noise Amplifier
DC : Down Converter
DAQ : Data-AcQuisition unit

FIG. 9

| Antennas element (Tx / Rx) | 4 by 4 Patch antennas |
|---|---|
| Height of antenna | 1.0 m |
| Distance between Tx and Rx | 4.0 m |
| Element spacing (Tx / Rx) | 0.5 λ |
| Frequency | 2.47125 GHz |
| Channel measure time,t | 33 s |
| Room size | 4 m × 4 m |
| Number of target | 1 |
| Number of measurement points | 81 points |
| Type of experiment | Full MIMO, SIMO |

ESTIMATION METHOD AND ESTIMATION DEVICE

This application is the U.S. National Phase under 35 U.S.C. § 371 of International Patent Application No. PCT/JP2022/023087, filed on Jun. 8, 2022, which in turn claims the benefit of Japanese Patent Application No. 2021-108202, filed on Jun. 29, 2021, the entire disclosures of which Applications are incorporated by reference herein.

TECHNICAL FIELD

The present disclosure relates to an estimation method and an estimation device that estimate a direction or a location of a living body using radio signals.

BACKGROUND ART

Patent Literatures (PTLs) 1 and 2 each disclose a method of finding, for example, a location of a person using radio signals. PTL 1 discloses a method of finding a location of a target person using a frequency response of a complex transfer function of a radio.

PTL 2 discloses a method of finding a location or a state of a target person using information on a difference between two complex transfer functions at two points of time with a predetermined interval among complex transfer functions of a radio.

PTL 3 discloses a method of performing timing correction for a plurality of sensors according to a timer correction command. PTL 4 discloses a method of measuring a fatigue degree based on statistical results from two sensors. PTL 5 discloses a method of distinguishing between a Doppler shift caused by a person and a clock frequency error between a transmitter and a receiver.

CITATION LIST

Patent Literature

[PTL 1] Japanese Unexamined Patent Application Publication No. 2015-72173
[PTL 2] Japanese Unexamined Patent Application Publication No. 2017-129558
[PTL 3] Japanese Unexamined Patent Application Publication No. 2014-216786
[PTL 4] Japanese Unexamined Patent Application Publication No. 2011-019845
[PTL 5] Japanese Unexamined Patent Application Publication No. 2020-109389

SUMMARY OF INVENTION

Technical Problem

To estimate the direction or the location of a living body relative to an estimation device that includes, for example, a transmitter having M antennas and a receiver having N antennas, each of the technologies disclosed in PTLs 1 to 5 needs to acquire channel state information (hereinafter, referred to as CSI) including M×N elements.

Some recent radios output only a part of CSI, such as M×1 or 1×N. It is difficult for such a radio that outputs only a part of CSI to estimate the direction or the location of the living body.

In response to the above issue, the present disclosure has an object to provide an estimation method capable of accurately estimating a direction or a location of a living body relative to an estimation device by using a radio that outputs at least a part of CSI, or more specifically, a radio capable of single input multiple output (SIMO) or multiple input single output (MISO).

Solution to Problem

In order to achieve the object, in accordance with an aspect of the present disclosure, an estimation method executed by an estimation device that includes: a first radio including a first antenna including M first antenna elements, where M is a natural number greater than or equal to two; and a second radio including a second antenna including N second antenna elements, where N is a natural number greater than or equal to two, includes: transmitting, using one first antenna element among the M first antenna elements, a first transmission signal multiple times to a measurement target region; observing a plurality of first reception signals that are received by the N second antenna elements and that include reflection signals reflected from a living body as a result of multiple transmissions of the first transmission signal, for a first period corresponding to a cycle of motion of the living body; transmitting, using one second antenna element among the N second antenna elements, a second transmission signal multiple times to a measurement target region; observing a plurality of second reception signals that are received by the M first antenna elements and that include reflection signals reflected from the living body as a result of multiple transmissions of the second transmission signal, for the first period; calculating a first combined complex transfer function representing propagation characteristics between the M first antenna elements and the N second antenna elements, based on the plurality of first reception signals and the plurality of second reception signals observed for the first period, the first combined complex transfer function comprising a plurality of first combined complex transfer functions; calculating a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions; calculating biological information corresponding to a predetermined frequency range of the plurality of second combined complex transfer functions, the predetermined frequency range corresponding to a component related to the living body; and estimating one of a direction and a location of the living body, by using the biological information according to a predetermined direction-of-arrival estimation method.

Advantageous Effects of Invention

The present disclosure implements a method of accurately estimating a direction or a location of a living body relative to an estimation device by using a radio that outputs at least a part of CSI.

BRIEF DESCRIPTION OF DRAWINGS

FIG. 1 is a block diagram illustrating an example of a configuration of an estimation device and an example of a detection target, according to Embodiment 1.

FIG. 6 is a block diagram illustrating an example of a configuration of an estimation device and an example of a detection target, according to Embodiment 2.

FIG. 9 is a diagram illustrating conditions of the experiment performed using the estimation method according to Embodiment 2.

DESCRIPTION OF EMBODIMENTS (Underlying Knowledge Forming Basis of the Present Disclosure)

The methods of finding, for example, the location of a person by using radio signals have been developed.

For example, PTL 1 discloses the method of finding the location or the state of the target person by analyzing a component including a Doppler shift using the Fourier transform. To be more specific, temporal change of an element of a complex transfer function is recorded, and the Fourier transform is performed on the resulting temporal waveform. A living body, such as a person, slightly causes a Doppler effect to a reflected wave because of a biological activity, such as breathing or heartbeat. Thus, the component including the Doppler shift includes an effect caused by the person. In contrast, a component including no Doppler shift corresponds to a radio signal that is not affected by the person, or more specifically, corresponds to a reflected wave from a fixed object or a direct wave between a transmitting antenna and a receiving antenna. PTL 1 discloses that, based on the above, the location or the state of the target person can be found out through the analysis of the component including the Doppler shift.

PTL 2 discloses the method of finding the location or the state of the target person by using the information on the difference between the two complex transfer functions at the two points of time with the predetermined interval among the complex transfer functions of the radio.

PTL 3 discloses the method of performing the timing correction by sending the timer correction command to the plurality of sensors. However, it is difficult to make a phase adjustment of an RF signal of the radio by the command. The technology disclosed in PTL 4 is intended for acceleration sensors, and thus is difficult to be applied to radios.

PTL 3 discloses the method of estimating the location of the person by reducing components generated from the Doppler shift caused by the person and from the clock frequency error. Here, examples of frequency fluctuations originating from the transmitter and the receiver include a clock frequency error between the transmitter and the receiver and a frequency error between sampling clocks used in an AD converter and a DA converter.

To estimate the direction or the location of the living body relative to the estimation device that includes, for example, the transmitter having the M antennas and the receiver having the N antennas, each of the technologies disclosed in PTLs 1 to 5 needs to acquire CSI including M×N elements.

Some recent radios output only a part of CSI, such as M×1 or 1×N. Such a radio that outputs only a part of CSI is unable to acquire CSI that includes M×N elements. Thus, it is difficult to estimate the direction or the location of the living body.

Figure 1:
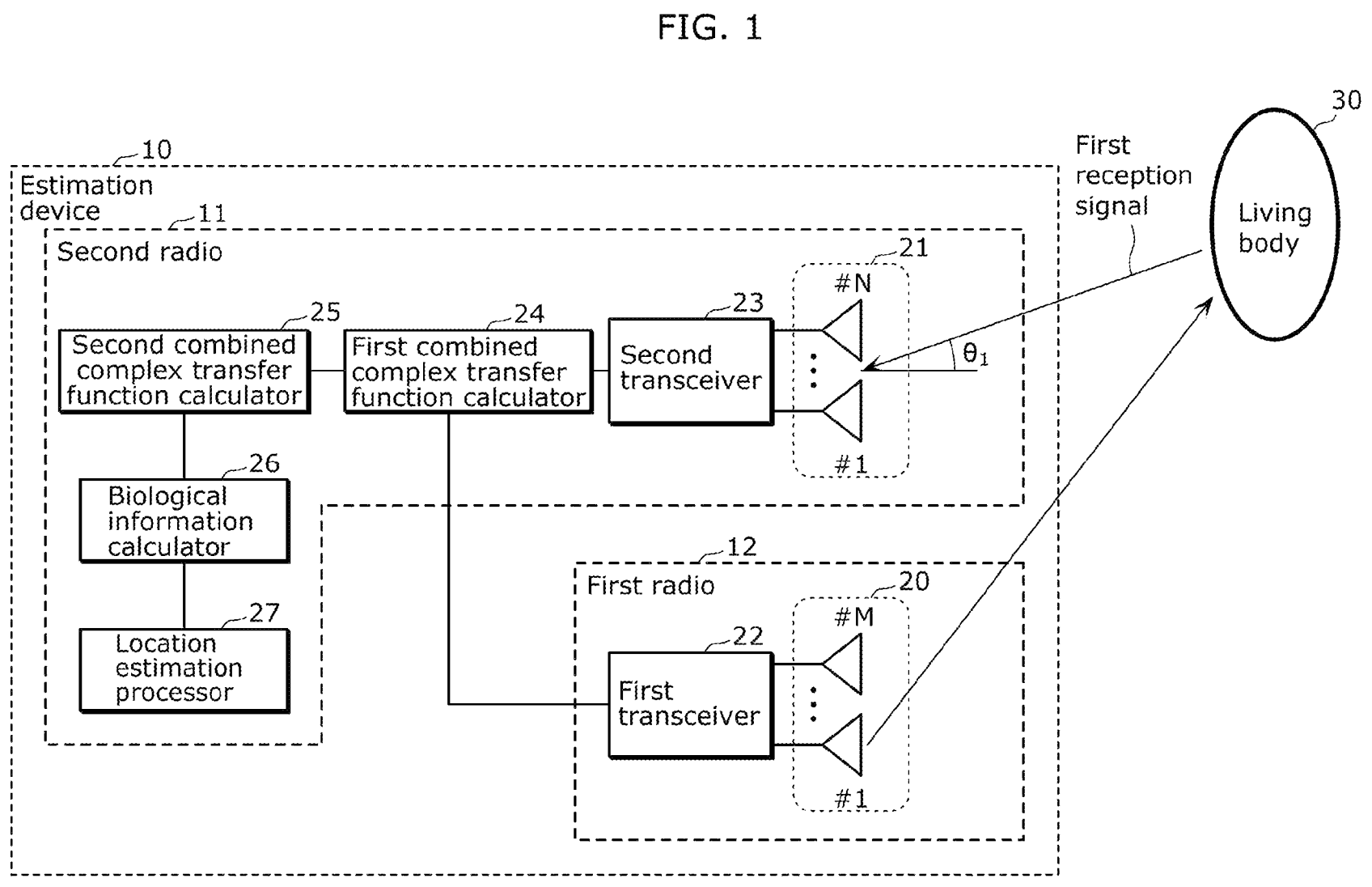
Figure 3:
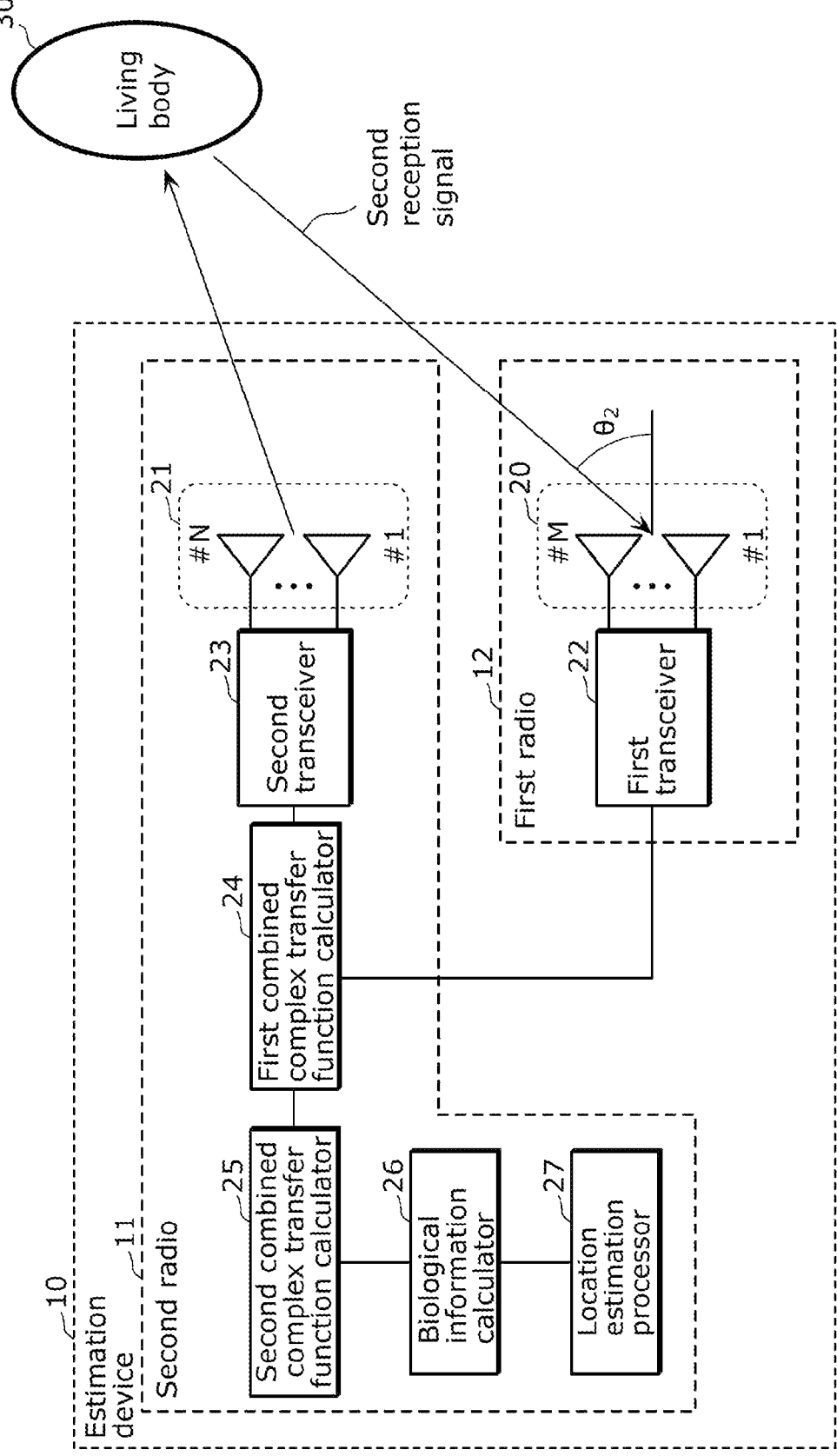
FIG. 3 is a block diagram illustrating an example of the configuration of the estimation device and an example of the detection target, according to Embodiment 1.

As a result of further study on the above issue, the inventors found out that a correlation function (or more specifically, a correlation matrix) of an estimation device was able to be calculated by acquiring outgoing CSI and incoming CSI and then combining the acquired CSI with consideration for phase rotation, as illustrated in FIG. 1 and FIG. 3. Here, the inventors found out that a difference between the CSI acquisition times, or a phase shift, and inversion of phase rotations between the outgoing signal and the incoming signal should be considered, in addition to the clock frequency error disclosed in PTL 4. This allowed the inventors to focus on first elements of the outgoing and incoming CSI to find out that a channel was able to be generated by combining these pieces of CSI after matching one of the phases to the other. This eventually led the inventors to find out the method of estimating the direction or the location of a living body using a radio that outputs only a part of CSI.

In accordance with an aspect of the present disclosure, an estimation method executed by an estimation device that includes: a first radio including a first antenna including M first antenna elements, where M is a natural number greater than or equal to two; and a second radio including a second antenna including N second antenna elements, where N is a natural number greater than or equal to two, includes: transmitting, using one first antenna element among the M first antenna elements, a first transmission signal multiple times to a measurement target region; observing a plurality of first reception signals that are received by the N second antenna elements and that include reflection signals reflected from a living body as a result of multiple transmissions of the first transmission signal, for a first period corresponding to a cycle of motion of the living body; transmitting, using one second antenna element among the N second antenna elements, a second transmission signal multiple times to a measurement target region; observing a plurality of second reception signals that are received by the M first antenna elements and that include reflection signals reflected from the living body as a result of multiple transmissions of the second transmission signal, for the first period; calculating a first combined complex transfer function representing propagation characteristics between the M first antenna elements and the N second antenna elements, based on the plurality of first reception signals and the plurality of second reception signals observed for the first period, the first combined complex transfer function comprising a plurality of first combined complex transfer functions; calculating a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions; calculating biological information corresponding to a predetermined frequency range of the plurality of second combined complex transfer functions, the predetermined frequency range corresponding to a component related to the living body; and estimating one of a direction and a location of the living body, by using the biological information according to a predetermined direction-of-arrival estimation method.

According to this aspect, in the case where a signal transmitted from one antenna element is received by a plurality of antenna elements, the direction or the location of the living body can be estimated by combining the outgoing CSI and the incoming CSI by performing the calculation to reduce the effects caused by the clock frequency error and the transmission power error between the first radio and the second radio. The outgoing CSI and the incoming CSI each may be a part of the CSI outputted by a radio that outputs only a part of CSI. Thus, the aforementioned estimation method can estimate the direction or the location of the living body, using the radio that outputs at least a part of CSI.

For example, it is possible that the calculating of the plurality of first combined complex transfer functions is performed by combining a first complex transfer function calculated from the plurality of first reception signals and a second complex transfer function calculated from the plurality of second reception signals, after matching one of phases of the first complex transfer function and the second complex transfer function to another using a first element of the first transmission signal and a first element of the second transmission signal.

According to this aspect, combining of the outgoing CSI and the incoming CSI after matching the phases of the first complex transfer function and the second complex transfer function more easily contributes to the reduction of the effects caused by the clock frequency error and the transmission power error between the first radio and the second radio. Thus, the aforementioned estimation method can more easily estimate the direction or the location of the living body, using the radio that outputs at least a part of CSI.

For example, it is possible that the calculating the second combined complex transfer function includes performing a predetermined calculation using at least one element of the first combined complex transfer function to reduce, from the first combined complex transfer function, a component corresponding to at least one of: (1) clock jitter between a transmitter that generates a transmission signal to be transmitted from an antenna and a receiver; or (2) timing jitter in one of: digital-to-analog conversion of the transmission signal; and analog-to-digital conversion of one of the first reception signal and the second reception signal.

According to this aspect, the second combined complex transfer function is more easily calculated by combining the outgoing CSI and the incoming CSI using at least one of: the clock jitter between the transmitter that generates the transmission signal to be transmitted from the antenna and the receiver; and the timing jitter of the digital-to-analog conversion of the transmission signal or the analog-to-digital conversion of the first reception signal or the second reception signal. Thus, the aforementioned estimation method can more easily estimate the direction or the location of the living body, using the radio that outputs at least a part of CSI.

For example, it is possible that the calculating the second combined complex transfer function includes performing phase correction on the first transmission signal and the second transmission signal using a first element of the first transmission signal and a first element of the second transmission signal to remove one of phase rotations of the first transmission signal and the second transmission signal with respect to another.

According to this aspect, the second combined complex transfer function can be more easily calculated by removing one of the phase rotations of the first transmission signal and the second transmission signal with respect to the other. Thus, the aforementioned estimation method can more easily estimate the direction or the location of the living body, using the radio that outputs at least a part of CSI.

In accordance with another aspect of the present disclosure, an estimation method executed by an estimation device that includes: a first radio including a first antenna including M first antenna elements, where M is a natural number greater than or equal to two; and a second radio including a second antenna including N second antenna elements, where N is a natural number greater than or equal to two, includes: transmitting, using each of the M first antenna elements, a first transmission signal multiple times to a measurement target region; observing a plurality of third reception signals that are received by one second antenna element among the N second antenna elements and that include reflection signals reflected from a living body as a result of multiple transmissions of the first transmission signal, for a first period corresponding to a cycle of motion of the living body; transmitting, using each of the N second antenna elements, a second transmission signal multiple times to a measurement target region; observing a plurality of fourth reception signals that are received by one first antenna element among the M first antenna elements and that include reflection signals reflected from the living body as a result of multiple transmissions of the second transmission signal, for the first period; calculating a first combined complex transfer function representing propagation characteristics between the M first antenna elements and the N second antenna elements, based on the plurality of third reception signals and the plurality of fourth reception signals observed for the first period, the first combined complex transfer function comprising a plurality of first combined complex transfer functions; calculating a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions; calculating biological information corresponding to a predetermined frequency range of the plurality of second combined complex transfer functions, the predetermined frequency range corresponding to a component related to the living body; and estimating one of a direction and a location of the living body using the biological information according to a predetermined direction-of-arrival estimation method.

According to this aspect, in the case where signals transmitted from a plurality of antenna elements are received by one antenna element, the direction or the location of the living body can be estimated by combining the outgoing CSI and the incoming CSI by performing the calculation to reduce the effects caused by the clock frequency error and the transmission power error between the first radio and the second radio. The outgoing CSI and the incoming CSI each may be a part of the CSI outputted by a radio that outputs only a part of CSI. Thus, the aforementioned estimation method can estimate the direction or the location of the living body, using the radio that outputs at least a part of CSI.

For example, it is possible that the calculating the first combined complex transfer function includes combining a first complex transfer function calculated from the plurality of third reception signals and a second complex transfer function calculated from the plurality of fourth reception signals, after matching one of phases of the first complex transfer function and the second complex transfer function to another using a first element of the third reception signal and a first element of the fourth reception signal.

According to this aspect, combining of the outgoing CSI and the incoming CSI after matching the phases of the first complex transfer function and the second complex transfer function more easily contributes to the reduction of the effects caused by the clock frequency error and the transmission power error between the first radio and the second radio. Thus, the aforementioned estimation method can more easily estimate the direction or the location of the living body, using the radio that outputs at least a part of CSI.

For example, it is possible that the calculating the second combined complex transfer function includes performing a predetermined calculation using at least one element of the first combined complex transfer function to reduce, from the first combined complex transfer function, a component corresponding to at least one of: (1) clock jitter between a transmitter that generates a transmission signal to be transmitted from an antenna and a receiver; or (2) timing jitter in one of: digital-to-analog conversion of the transmission signal; and analog-to-digital conversion of one of the third reception signal and the fourth reception signal.

According to this aspect, the second combined complex transfer function is more easily calculated by combining the outgoing CSI and the incoming CSI using at least one of: the clock jitter between the transmitter that generates the transmission signal to be transmitted from the antenna and the receiver; and the timing jitter of the digital-to-analog conversion of the transmission signal or the analog-to-digital conversion of the first reception signal or the second reception signal. Thus, the aforementioned estimation method can more easily estimate the direction or the location of the living body, using the radio that outputs at least a part of CSI.

For example, it is possible that the calculating the second combined complex transfer function includes performing phase correction on the third reception signal and the fourth reception signal using a first element of the third reception signal and a first element of the fourth reception signal to remove one of phase rotations of the third reception signal and the fourth reception signal with respect to another.

According to this aspect, the second combined complex transfer function can be more easily calculated by removing one of the phase rotations of the first transmission signal and the second transmission signal with respect to the other. Thus, the aforementioned estimation method can more easily estimate the direction or the location of the living body, using the radio that outputs at least a part of CSI.

For example, it is possible that the calculating the second combined complex transfer function includes extracting one element from the first combined complex transfer function and dividing all elements of the first combined complex transfer function by the one element extracted.

According to this aspect, the second combined complex transfer function can be more easily calculated from the first combined complex transfer function by the division by the one element extracted from the first combined complex transfer function. Thus, the aforementioned estimation method can more easily estimate the direction or the location of the living body, using the radio that outputs at least a part of CSI.

For example, it is possible that the calculating the second combined complex transfer function includes calculating an average value of all elements of the first combined complex transfer function and dividing the all elements of the first combined complex transfer function by the average value calculated.

According to this aspect, the second combined complex transfer function can be more easily calculated from the first combined complex transfer function by the division by the average value of the all elements of the first combined complex transfer function. Thus, the aforementioned estimation method can more easily estimate the direction or the location of the living body, using the radio that outputs at least a part of CSI.

For example, it is possible that the calculating the second combined complex transfer function includes: calculating a correlation matrix of the first combined complex transfer function according to a predetermined method and performing eigenvalue decomposition on the correlation matrix to calculate at least one eigenvalue and at least one eigenvector corresponding to the at least one eigenvalue; calculating a third complex transfer function, which is a channel component of a direct wave, by multiplying the first combined complex transfer function by an eigenvector that, among the at least one eigenvector calculated, corresponds to a largest eigenvalue among the at least one eigenvalue calculated; and dividing all elements of the first combined complex transfer function by the third complex transfer function.

According to this aspect, the second combined complex transfer function can be more easily calculated from the first combined complex transfer function using the eigenvalue and the eigenvector calculated from the first combined complex transfer function. Thus, the aforementioned estimation method can more easily estimate the direction or the location of the living body, using the radio that outputs at least a part of CSI.

For example, it is possible that the calculating the second combined complex transfer function includes: calculating a fourth complex transfer function, which is a channel component of a direct wave, by multiplying the first combined complex transfer function by a left singular vector and a right singular vector that are obtained by performing singular value decomposition on the first combined complex transfer function according to a predetermined method; and dividing all elements of the first combined complex transfer function by the fourth complex transfer function.

According to this aspect, the second combined complex transfer function can be more easily calculated from the first combined complex transfer function using the singular value and the singular vector calculated from the first combined complex transfer function. Thus, the aforementioned estimation method can more easily estimate the direction or the location of the living body, using the radio that outputs at least a part of CSI.

For example, it is possible that the predetermined direction-of-arrival estimation method is based on at least one of a multiple signal classification (MUSIC) method, a beamformer method, or a Capon method.

According to this aspect, the direction or the location of the living body can be more easily estimated according to one of the MUSIC method, the beamformer method, and the Capon method. Thus, the aforementioned estimation method can more easily estimate the direction or the location of the living body, using the radio that outputs at least a part of CSI.

For example, it is possible that one of the first reception signal and the second reception signal is an orthogonal frequency division multiplexing (OFDM) modulated signal.

According to this aspect, the direction or the location of the living body can be more easily estimated using the first reception signal or the second reception signal that is an OFDM modulated signal. Thus, the aforementioned estimation method can more easily estimate the direction or the location of the living body, using the radio that outputs at least a part of CSI.

For example, it is possible that one of the third reception signal and the fourth reception signal is an orthogonal frequency division multiplexing (OFDM) modulated signal.

According to this aspect, the direction or the location of the living body can be more easily estimated using the first reception signal or the second reception signal that is an OFDM modulated signal. Thus, the aforementioned estimation method can more easily estimate the direction or the location of the living body, using the radio that outputs at least a part of CSI.

In accordance with still another aspect of the present disclosure, an estimation device includes: a first radio including a first antenna including M first antenna elements, where M is a natural number greater than or equal to two; and a second radio including a second antenna including N second antenna elements, where N is a natural number greater than or equal to two, wherein the first radio causes one first antenna element among the M first antenna elements to transmit a first transmission signal multiple times to a measurement target region; the second radio observes a plurality of first reception signals that are received by the N second antenna elements and that include reflection signals reflected from a living body as a result of multiple transmissions of the first transmission signal, for a first period corresponding to a cycle of motion of the living body; the second radio causes one second antenna element among the N second antenna elements to transmit a second transmission signal multiple times to a measurement target region; the first radio observes a plurality of second reception signals that are received by the M first antenna elements and that include reflection signals reflected from the living body as a result of multiple transmissions of the second transmission signal, for the first period; and the estimation device further comprising: first combined complex transfer function calculator that calculates a first combined complex transfer function representing propagation characteristics between the M first antenna elements and the N second antenna elements, based on the plurality of first reception signals and the plurality of second reception signals observed for the first period, the first combined complex transfer function comprising a plurality of first combined complex transfer functions; a second combined complex transfer function calculator that calculates a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions; a biological information calculator that extracts biological information corresponding to a predetermined frequency range of the plurality of second combined complex transfer functions, the predetermined frequency range corresponding to a component related to the living body; and a location estimation processor that estimates one of a direction and a location of the living body using the biological information according to a predetermined direction-of-arrival estimation method.

This aspect achieves the same advantageous effect as the estimation method described above.

In accordance with still another aspect of the present disclosure, An estimation device includes: a first radio including a first antenna including M first antenna elements, where M is a natural number greater than or equal to two; and a second radio including a second antenna including N second antenna elements, where N is a natural number greater than or equal to two, wherein the first radio causes each of the M first antenna elements to transmit a first transmission signal multiple times to a measurement target region, the second radio observes a plurality of third reception signals that are received by one second antenna element among the N second antenna elements and that include reflection signals reflected from a living body as a result of multiple transmissions of the first transmission signal, for a first period corresponding to a cycle of motion of the living body, the second radio causes each of the N second antenna elements to transmit a second transmission signal multiple times to a measurement target region, the first radio observes a plurality of fourth reception signals that are received by one first antenna element among the M first antenna elements and that include reflection signals reflected from the living body as a result of multiple transmissions of the second transmission signal, for the first period, and the estimation device further comprising: a first combined complex transfer function calculator that calculates a first combined complex transfer function representing propagation characteristics between the M first antenna elements and the N second antenna elements, based on the plurality of third reception signals and the plurality of fourth reception signals observed for the first period, the first combined complex transfer function comprising a plurality of first combined complex transfer functions; a second combined complex transfer function calculator that calculates a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions; a biological information calculator that extracts biological information corresponding to a predetermined frequency range of the plurality of second combined complex transfer functions, the predetermined frequency range corresponding to a component related to the living body; and a location estimation processor that estimates one of a direction and a location of the living body using the biological information according to a predetermined direction-of-arrival estimation method.

This aspect achieves the same advantageous effect as the estimation method described above.

It should be noted that the present disclosure can be implemented not only as a device, but also as an integrated circuit that includes the processing units included in such device, a method that includes as its steps the processing units included in the device, a program that causes a computer to execute these steps, and information, data, or signals that represent such program. Also, such program, information, data, and signals may be distributed in a recording medium such as a CD-ROM, or via a communication medium such as the Internet.

Hereinafter, certain exemplary embodiments are described in greater detail with reference to the accompanying Drawings. Each of the exemplary embodiments described below shows a general or specific example of the present disclosure. The numerical values, shapes, materials, elements, the arrangement and connection of the elements, steps, the processing order of the steps etc. shown in the following exemplary embodiments are mere examples, and therefore do not limit the present disclosure. Therefore, among the elements in the following exemplary embodiments, those not recited in any one of the independent claims are described as optional elements. Also, in the specification and the drawings, elements having substantially the same functional configuration are assigned the same reference marks and are not described to avoid redundancy.

Embodiment 1

The present embodiment describes an estimation device and an estimation method that accurately estimate a direction or a location of a living body relative to the estimation device using a radio that outputs at least a part of CSI.

To be more specific, the present embodiment describes estimation device 10 and the estimation method that estimate the direction of the living body by combining, even if SIMO-based, outgoing CSI and incoming CSI. Estimation device 10 and the estimation method are capable of estimating the direction of the living body by: combining the outgoing CSI and the incoming CSI; extracting a direct wave that travels without being reflected from the living body: detecting a phase rotation caused by a frequency error; and removing, from the whole channel, the phase rotation originating from the frequency error.

The following describes that estimation device 10 according to the present embodiment estimates the direction of the living body, which is a detection target, using the outgoing CSI and the incoming CSI obtained by predetermined two radios, with reference to the drawings.

[Configuration of Estimation Device 10]

FIG. 1 is a block diagram illustrating an example of the configuration of estimation device 10 according to the present embodiment. FIG. 1 also illustrates living body 30, which is a detection target of estimation device 10 illustrated in FIG. 1.

Figure 10:
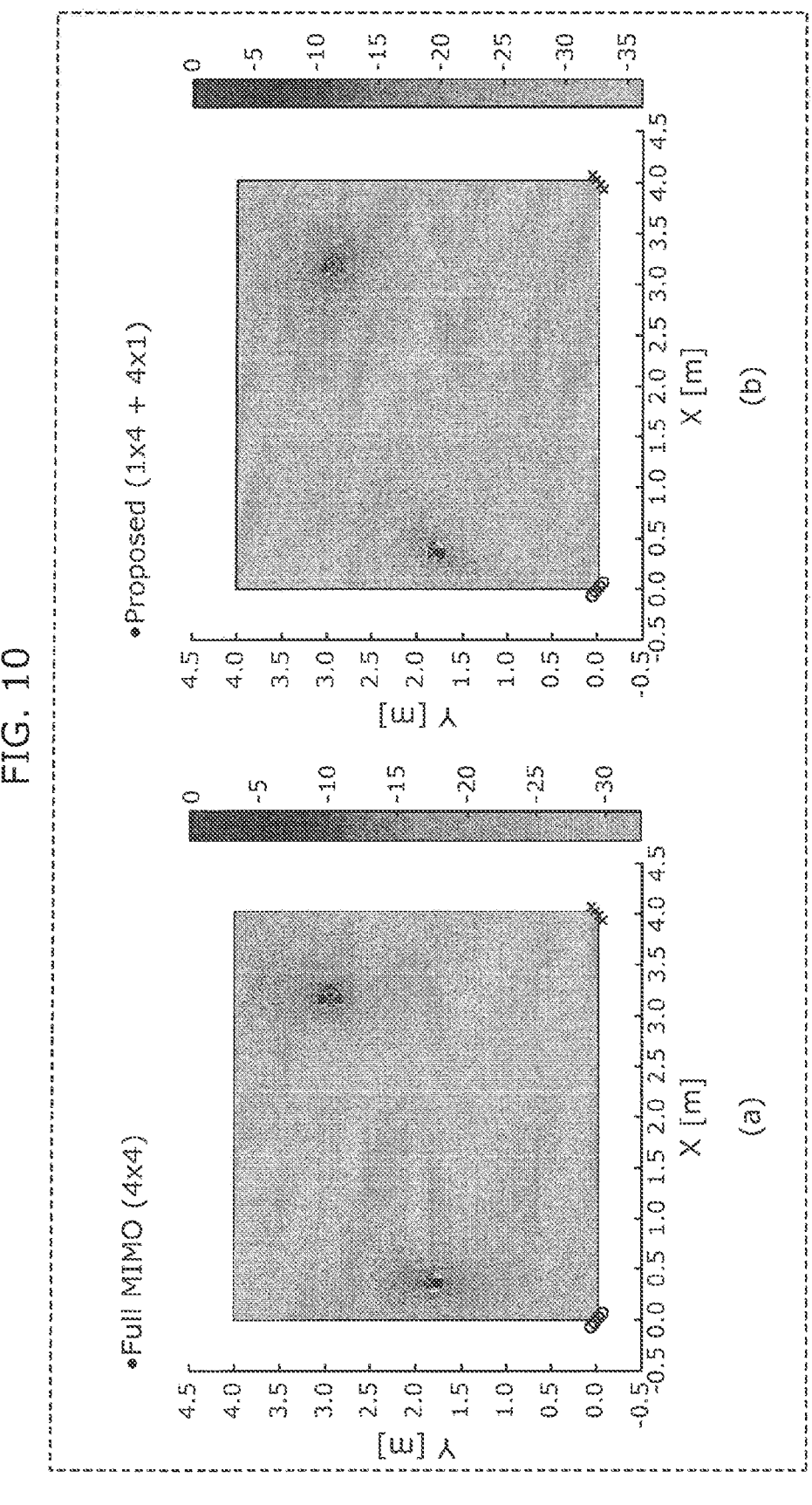
FIG. 10 is a diagram illustrating results of the experiment performed using the estimation method according to Embodiment 2.

Estimation device 10 illustrated in FIG. 10 includes second radio 11, first radio 12, antenna 20, antenna 21, first transceiver 22, second transceiver 23, first combined complex transfer function calculator 24, second combined complex transfer function calculator 25, biological information calculator 26, and location estimation processor 27. Estimation device 10 estimates the direction of living body 30 relative to estimation device 10.

Note that although estimation device 10 is a single cabinet that includes all the aforementioned structural components, this is not intended to be limiting. Estimation device 10 may include a plurality of devices that are communicatively connected to each other, and the aforementioned structural components may be separately located in the plurality of devices. In this case, estimation device 10 may be referred to as an estimation system.

FIG. 1 illustrates that estimation device 10, which includes first radio 12 having M antenna elements and second radio 11 having N antenna elements, obtains CSI (corresponding to outgoing CSI) when first radio 12 transmits a known signal to second radio 11. FIG. 3 illustrates that estimation device 10 obtains CSI (corresponding to incoming CSI) when second radio 11 transmits a known signal to first radio 12. Here, although estimation device 10 has a full MIMO configuration, the method of estimating the location of living body 30 using the SIMO-based outgoing and incoming CSI obtained is described as an example.

[First Radio 12]

Figure 2:
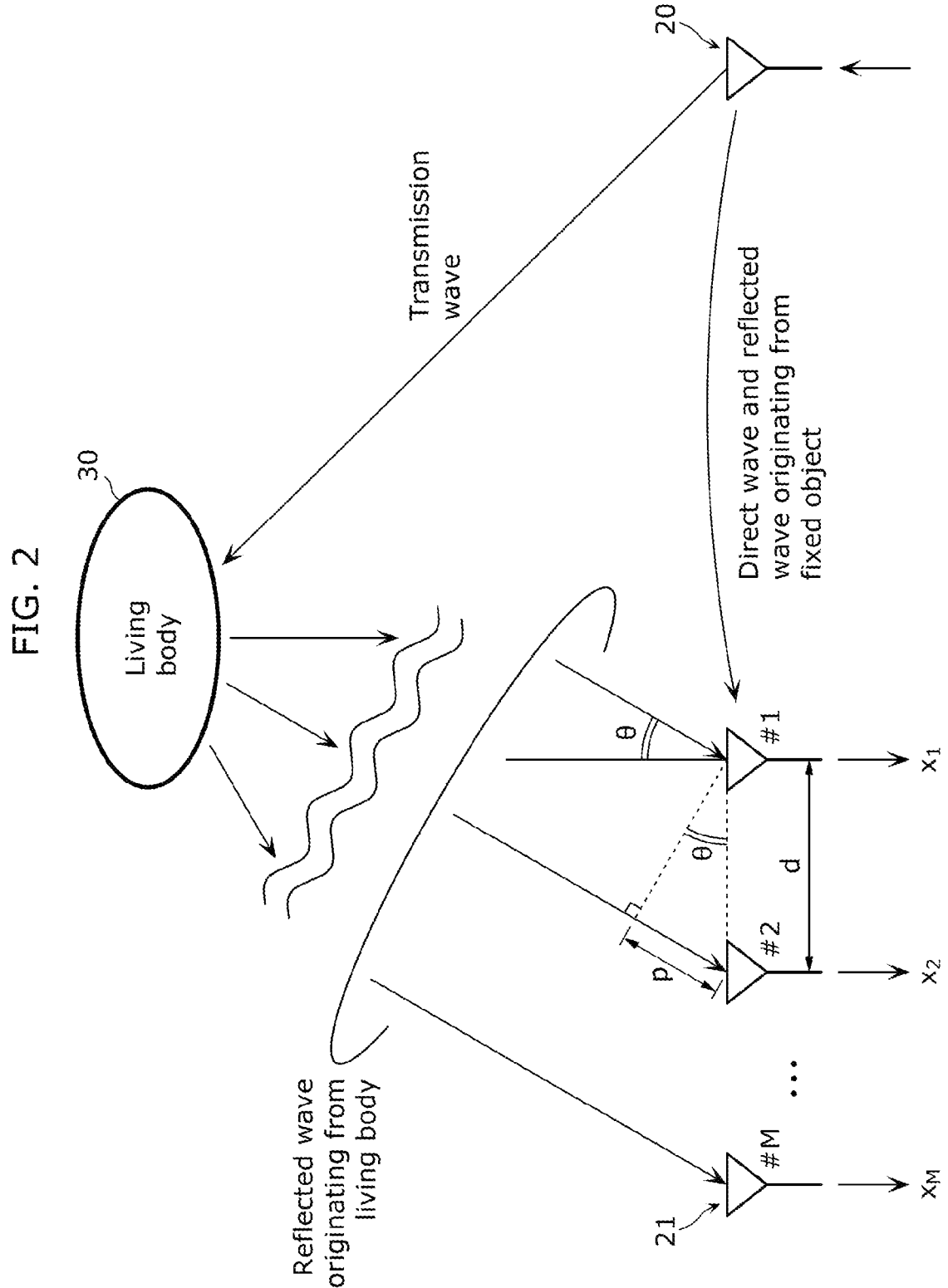
FIG. 2 is a conceptual diagram illustrating signal-wave transmission of antennas illustrated in FIG. 1.

First radio 12 generates high-frequency signals used for estimating the direction of living body 30, using internal clock fTX of first radio 12. As illustrated in FIG. 2, first radio 12 transmits the generated signals (transmission waves) from the antenna elements included in antenna 20, for example. At the time of signal reception, first radio 12 processes each of signals received by the antenna elements.

Figure 4:
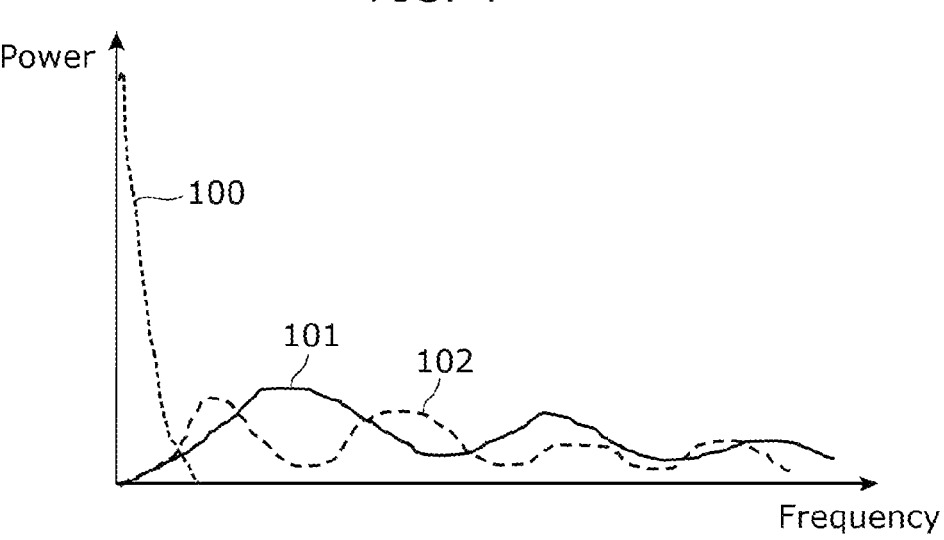
FIG. 4 is a conceptual diagram illustrating an example of frequency components of signal I and signal Q received according to Embodiment 1.

FIG. 4 is a conceptual diagram illustrating an example of frequency components of signal I and signal Q received by estimation device 10 according to the present embodiment. To be more specific, dotted line 100 in FIG. 4 denotes a DC component of the signal received by estimation device 10, and solid line 101 in FIG. 4 denotes an AC component of signal I received by estimation device 10. Moreover, broken line 102 in FIG. 4 denotes an AC component of signal Q received by estimation device 10.

[Antenna 20]

Antenna 20 includes the M antenna elements (where M is a natural number greater than or equal to two) (or more specifically, antenna elements #1 to #M).

[First Transceiver 22]

First transceiver 22 transmits or receives predetermined signals via the M antenna elements.

At the time of signal transmission, first transceiver 22 transmits a known signal for living body estimation.

At the time of signal reception, first transceiver 22 observes a reception signal that is received by each of the antenna elements and that includes a reflection signal reflected from living body 30 after being transmitted from the antenna element on the transmitting side. First transceiver 22 observes the reception signal for a first period corresponding to a cycle derived from an activity of living body 30.

Here, the antenna element on the transmitting side can be included in antenna 21 of second radio 11. Living body 30 illustrated in FIG. 2 is not intended to be limiting. The cycle derived from the activity of living body 30 is a living-body-originated cycle (biological fluctuation cycle) that includes at least one of breathing, heartbeat, and body motion of living body 30. First transceiver 22 transmits the observed reception signal, as a second reception signal, to first combined complex transfer function calculator 24.

[Second Radio 11]

As with first radio 12, second radio 11 generates high-frequency signals used for estimating the direction of living body 30, using internal clock fRX. As illustrated in FIG. 2, sensor radio 11 transmits the generated signals (transmission waves) from the antenna elements included in antenna 21, for example.

At the time of signal reception, sensor radio 11 processes each of signals received by the antenna elements.

[Antenna 21]

Antenna 21 includes the N antenna elements (where N is a natural number greater than or equal to two) (or more specifically, antenna elements #1 to #N).

[Second Transceiver 23]

Second transceiver 23 observes a reception signal that is received by each of the N antenna elements and that includes a reflection signal reflected from living body 30 after being transmitted from the antenna element on the transmitting side. Second transceiver 23 observes the reception signal for a first period corresponding to a cycle derived from an activity of living body 30. Here, this first period may be the same as the first period during which first transceiver 22 observes the reception signal.

Second transceiver 23 transmits the observed reception signal, as a first reception signal, to first combined complex transfer function calculator 24.

In the present embodiment, first transceiver 22 and second transceiver 23 include the plurality of antenna elements and convert, using internal clock fTX and fRX respectively, the high-frequency signals received by the respective antenna elements into processable low-frequency signals.

To be more specific, when using the SIMO-based CSI, first transceiver 22 transmits a known signal for CSI acquisition from a predetermined one of the antenna elements included in antenna 20. Each of the N antenna elements included in antenna 21 of second radio 11 receives the signal transmitted and then reflected from living body 30. Second transceiver 23 transmits the received signal, as the first reception signal, to first combined complex transfer function calculator 24.

Furthermore, second transceiver 23 transmits a known signal for CSI acquisition from a predetermined one antenna element included in antenna 21. Each of the M antenna elements included in antenna 20 of first radio 12 receives the signal transmitted and then reflected from living body 30. First transceiver 22 transmits the received signal, as the second reception signal, to first combined complex transfer function calculator 24.

[First Combined Complex Transfer Function Calculator 24]

First combined complex transfer function calculator 24 calculates, from the first reception signal and the second reception signal, a plurality of complex transfer functions representing propagation characteristics between first radio 12 and second radio 11.

First combined complex transfer function calculator 24 calculates the complex transfer functions representing the propagation characteristics between first radio 12 and second radio 11, from the low-frequency first reception signal and second reception signal transmitted from first transceiver 22 and second transceiver 23.

Hereafter, acquisition of the outgoing CSI is described in detail with reference to FIG. 2.

FIG. 2 is a conceptual diagram illustrating the signal-wave transmission of antenna 21 illustrated in FIG. 1. As illustrated in FIG. 2, the transmission wave transmitted from the antenna element of antenna 20 is reflected from living body 30 and reaches an array antenna of antenna 21. Here, the array antenna is a linear array that includes the M antenna elements with interelement spacings d. The direction of living body 30 when viewed from the front of the array antenna is denoted as θ. The distance between living body 30 and the array antenna is sufficiently long, and the reflected wave that originates from living body 30 and reaches the array antenna is assumed to be a plane wave.

In this case, first combined complex transfer function calculator 24 is able to calculate a first complex transfer function vector that represents the propagation characteristics between the antenna element on the transmitting side and the array antenna on the receiving side, based on a first reception signal vector observed using the array antenna. The first reception signal vector is expressed as below.

[Math. 1]

$$x = [x_1 \ \ldots \ , x_M]$$

First complex transfer function vector $h_F$ is calculated from the following expressions, for example.

[Math. 2]

$$h_F = x/s$$

[Math. 3]

$$h_F = [h_{F11} \ \ldots \ , h_{FM1}]$$

Here, s denotes a complex transmission signal that is known. Note that first complex transfer function vector $h_F$, which is the outgoing CSI, is an example of the first complex transfer function.

Next, acquisition of the incoming CSI is described.

As with the outgoing CSI, first combined complex transfer function calculator 24 is able to calculate a second complex transfer function vector that represents the propagation characteristics between the antenna element on the transmitting side and the array antenna on the receiving side, based on a second reception signal vector observed using the array antenna. The second reception signal vector is expressed as below.

[Math. 4]

$$x = [x_1 \ \ldots \ , x_N]$$

Second complex transfer function vector $h_B$ is calculated from the following expressions, for example.

[Math. 5]

$$h_B = x/s$$

[Math. 6]

$$h_B = [h_{B11} \ \ldots \ , h_{B1N}]^T$$

Note that the following expression denotes transpose.

[Math. 7]

$$[\cdot]^T$$

Here, $h_{F11}$ and $h_{B11}$ are the same value originally (in other words, by design). However, their phases are different due to a clock frequency error, a power error, or acquisition time difference. Thus, after one of the phases is matched to the other, the channels are combined (or more specifically, the first complex transfer function vector and the second complex transfer function vector are combined) as described below.

[Math. 8]

$$h'_B(t) = h_B \times \frac{h_{F11}}{h_{B11}} = (h'_{B11}, \ \ldots \ , h'_{B1N})^T$$

More specifically, using a first element of a first transmission signal and a first element of a second transmission signal, first combined complex transfer function calculator 24 matches one of the phases of the first complex transfer function calculated from a plurality of first reception signals and the second complex transfer function calculated from a plurality of second reception signals to the other. After this, by combining the first complex transfer function and the second complex transfer function, first combined complex transfer function calculator 24 calculates the first combined complex transfer function.

Thus, first combined complex transfer function vector h(t) is expressed as below.

[Math. 9]

$$h(t) = (h'_{B11}, \ldots , h'_{B1N}, h_{F12}, \ldots h_{FM1})^T$$

[Second Combined Complex Transfer Function Calculator 25]

Furthermore, first combined complex transfer function vector h(t) includes frequency fluctuation components originating from a transmitter and a receiver and a Doppler shift originating from living body 30. Examples of the frequency fluctuation component include (i) attenuation or phase rotation caused by spatial propagation of the transmission signal, (ii) a clock frequency error (fRX-fTX) between the transmitter and the receiver, and (iii) a frequency error between sampling clocks used for, for example, DA conversion in the radios. To remove, from first combined complex transfer function vector h(t), the phase rotation caused by the frequency fluctuation components originating from the transmitter and the receiver, second combined complex transfer function calculator 25 extracts any one element $h_l$ from h(t) as a direct wave component.

[Math. 10]

$$h' = h(t)/h_l$$

Second combined complex transfer function calculator 25 calculates second combined complex transfer function vector h' by removing the phase rotation by dividing all elements of first combined complex transfer function vector h(t) by the aforementioned one element $h_l$ extracted as the direct wave component. Here, any element, such as element $h_1$, included in first combined complex transfer function vector h(t) may be used as the element of the direct wave component. Note that second combined complex transfer function vector h' is an example of the second combined complex transfer function.

As described above, by performing a predetermined calculation using at least one element of first combined complex transfer function vector h(t), second combined complex transfer function calculator 25 calculates second combined complex transfer function vector h'. Second combined complex transfer function vector h' has a component reduced from first combined complex transfer function vector h(t), the component corresponding to at least one of (1) clock jitter between first radio 12 and second radio 11 and (2) timing jitter in digital-to-analog conversion of the transmission signal or analog-to-digital conversion of the reception signal.

[Biological Information Calculator 26]

Using second combined complex transfer function vectors h' calculated, biological information calculator 26 calculates the biological information by calculating information on a difference between two second combined complex transfer function vectors h' at two points of time with a predetermined interval, as with the difference information calculator disclosed in PTL 1. To be more specific, to extract the biological information corresponding to the component related to living body 30, biological information calculator 26 extracts the biological information corresponding to a predetermined frequency range of the plurality of second combined complex transfer function vectors h' calculated. For example, biological information calculator 26 extracts the biological information corresponding to the component affected by a vital activity including at least one of breathing, heartbeat, and body motion of living body 30.

Note that this biological information may be obtained by calculating a living-body-originated component from second combined complex transfer function vectors h'. Thus, it should be obvious that the same advantageous effect can be achieved using a frequency response.

In the present embodiment, the plurality (N) of antenna elements are provided. On this account, there are a plurality of difference values (a plurality of pieces of difference information) of second combined complex transfer function vectors h' corresponding to antenna 21. These are collectively defined as a complex difference channel vector. For the N antenna elements, the complex difference channel vector is expressed as below.

[Math. 11]

$$h(l, m) = \left[h_1(l, m), \ldots , h_{M_R}(l, m)\right]^T \qquad \text{(Expression 1)}$$

[Math. 12]

$$1 \le l \le N, 1 \le m \le N$$

(where $l \ne m$, and $N$ denotes the total count of measurements)

Here, l and m are each a positive integer that indicates a measurement number representing a sample time.

[Location Estimation Processor 27]

Using the living body information extracted from second combined complex transfer function vector h', location estimation processor 27 estimates the direction of living body 30 relative to the direction of estimation device 10 by a predetermined direction-of-arrival estimation method. More specifically, the direction-of-arrival estimation method may be based on a multiple signal classification (MUSIC) algorithm as used by the direction estimation processor disclosed in PTL 1. Although the estimation method based on this algorithm is described as an example, the estimation method may be based on a beamformer method or a Capon method.

By the MUSIC algorithm using the complex difference channel vector expressed by Expression 1 for example, location estimation processor 27 performs eigenvalue decomposition of a correlation matrix as below.

[Math. 13]

$$R = E\left[h(l, m)h(l, m)^H\right] = U\Lambda U^H$$

Here, U denotes an eigenvector matrix, and E denotes a calculation performed to obtain an average of l and m varied. Furthermore, MUSIC spectrum P is expressed as below.

[Math. 14]

$$P = \frac{a^H a}{a^H U_N U_N^H a} \qquad \text{(Expression 2)}$$

Here, $U_N$ denotes a noise space eigenvector, and a denotes a steering vector.

[Math. 15]

$$A = a_B \cdot a_F^T = \begin{pmatrix} a_{11} & \cdots & a_{M1} \\ \vdots & \ddots & \vdots \\ a_{1N} & \cdots & a_{MN} \end{pmatrix}$$

Here, $a_F$ denotes an outgoing steering vector, and $a_B$ denotes an incoming steering vector.

[Math. 16]

$$a = (a_{11}, \ldots, a_{1N}, a_{12}, \ldots a_{M1})^T$$

Note that the signal transmitted from first radio 12 may be a continuous wave (CW) signal or an encoded signal, such as an orthogonal frequency division multiplexing (OFDM) signal.

[Other Examples of Direct Wave Component]

Second combined complex transfer function calculator 25 according to the present embodiment calculates second combined complex transfer function vector h' by dividing first combined complex transfer function vector h(t) by any one element $h_l$ of first combined complex transfer function vector h(t) as the direct wave component. However, the division need not be performed using the one element $h_l$.

For example, as the direct wave component used for dividing first combined complex transfer function vector h(t), second combined complex transfer function calculator 25 may use element $h_{lmin}$ having the minimum fluctuation for |$h_l$|, instead of any one element $h_l$ used by a conventional asynchronous absorption method. Alternatively, an average value of all the elements of first complex transfer function vector $h_0$ may be used. Alternatively, the complex transfer function may be observed for a certain period of time, and then a singular vector may be obtained by singular value decomposition of the complex transfer function of any time t. Using this singular vector, second combined complex transfer function vector h' may be calculated. Alternatively, the complex transfer function may be observed for a certain period of time, and then an eigenvector may be obtained by eigenvalue decomposition of a correlation matrix of this whole observation time. From this eigenvector, second combined complex transfer function vector h' may be calculated. Alternatively, an eigenvector may be obtained as the direct wave component by eigenvalue decomposition of a correlation matrix of this whole observation time. Using this eigenvector, second combined complex transfer function vector h' may be calculated.

Note that, because the outgoing phase rotation and the incoming phase rotation are opposite to each other, first combined complex transfer function calculator 24 calculates the following using first complex transfer function vector $h_F$ and second complex transfer function vector $h_B$.

[Math. 17]

$$h'_F(t) = h_F \times \exp j\left(\frac{1}{2}\angle\frac{h_{B11}}{h_{F11}}\right) = (h'_{F11}, \ldots, h'_{FM1})^T$$

[Math. 18]

$$h'_B(t) = h_B \times \exp j\left(\frac{1}{2}\angle\frac{h_{F11}}{h_{B11}}\right) = (h'_{B11}, \ldots, h'_{B1N})^T$$

From these, the second complex transfer function vector may be calculated as below.

[Math. 19]

$$h(t) = (h'_{B11}, \ldots, h'_{B1N}, h'_{F12}, \ldots h'_{FM1})^T$$

As a result, the phase rotation is removed. Thus, this is the same as making observation at an intermediate frequency between two stations.

Note that first radio 12, second radio 11, first combined complex transfer function calculator 24, second combined complex transfer function calculator 25, biological information calculator 26, and location estimation processor 27 may be implemented by at least one processor executing a program stored in a memory included in estimation device 10, or may be implemented by at least one dedicated circuit. More specifically, these structural components may be implemented by software or hardware.

[Operation of Estimation Device 10]

Figure 5:
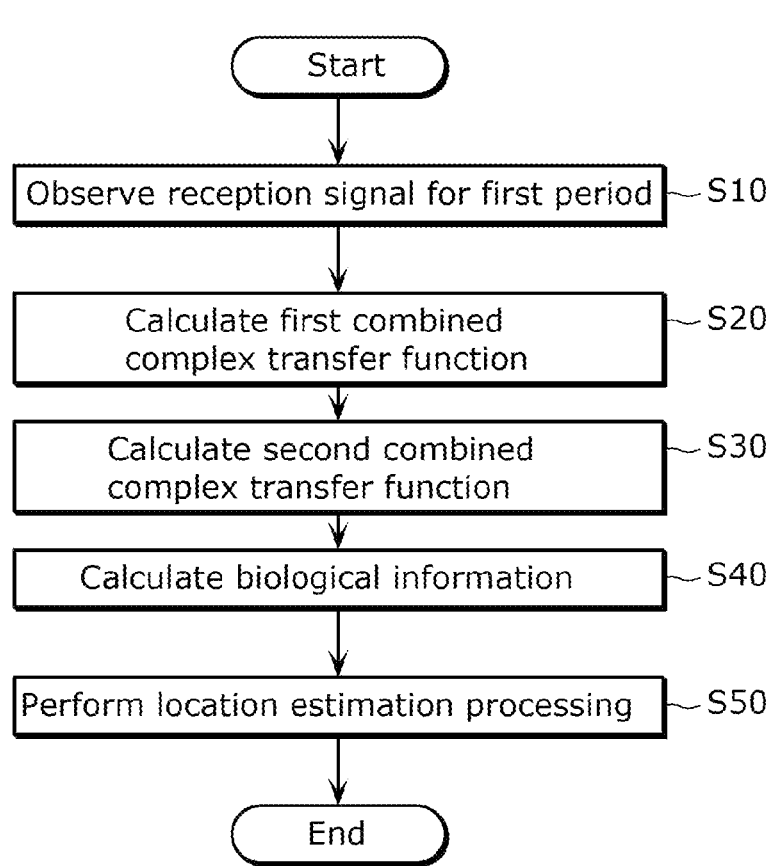
FIG. 5 is a flowchart illustrating estimation processing performed by the estimation device according to Embodiment 1.

Estimation processing performed by estimation device 10 having the above configuration is described. FIG. 5 is a flowchart illustrating the estimation processing performed by estimation device 10 according to the present embodiment.

First, estimation device 10 causes first radio 12 and second radio 12 each to transmit, to a measurement target region, a transmission signal and observes a reception signal for the first period (S10). To be more specific, estimation device 10 observes the reception signal that includes a reflection signal reflected from living body 30 after being transmitted from one antenna element, for the first period corresponding to the cycle derived from the activity of living body 30. The observation is made for each of the outgoing signal and the incoming signal.

Next, estimation device 10 calculates the plurality of first combined complex transfer functions that represent the propagation characteristics between one antenna element on the transmitting side and the plurality of antenna elements on the receiving side, from the plurality of reception signals observed for the first period in Step S10 (S20). This is described in detail above and thus the description is omitted here. Such omission of description is made similarly in the following.

Next, estimation device 10 calculates the second combined complex transfer function by dividing the first combined complex transfer function calculated in Step S20 by the direct wave component (S30).

Next, estimation device 10 calculates the biological information from the second combined complex transfer function calculated in Step S30 (S40).

Then, estimation device 10 estimates the location of living body 30 using at least two pieces of biological information calculated in Step S40 (S50).

[Advantageous Effects Etc]

Estimation device 10 and the estimation method according to the present embodiment: extracts a direct wave component, which travels without being reflected from living body 30, from a reception signal; detects a phase rotation caused by a frequency error; and removes, from the whole channel, the clock jitter between the transmitter and the receiver and the phase rotation resulting from the frequency error. As a result, the direction of living body 30 can be accurately estimated. Hence, estimation device 10 is capable of accurately estimating the direction of living body 30 relative to estimation device 10.

Embodiment 2

The present embodiment is different from Embodiment 1, and describes an estimation device and an estimation method that accurately estimate a direction or a location of a living body relative to the estimation device using a radio that outputs at least a part of CSI.

The present embodiment describes estimation device 10A and an estimation method that estimate a direction of a living body by combining, even if MISO-based, outgoing CSI and incoming CSI.

[Configuration of Estimation Device 10A]

Figure 6:
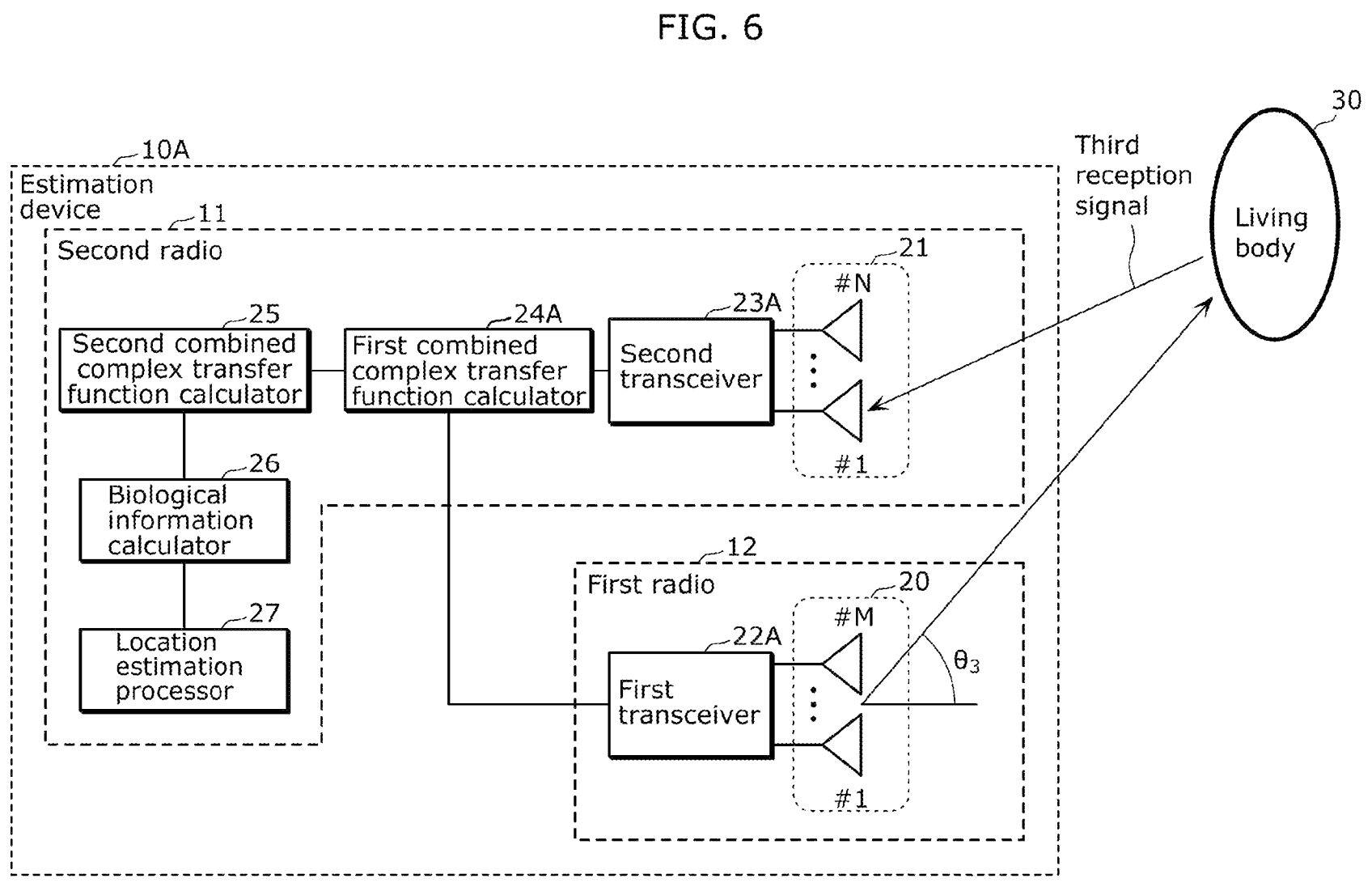
Figure 7:
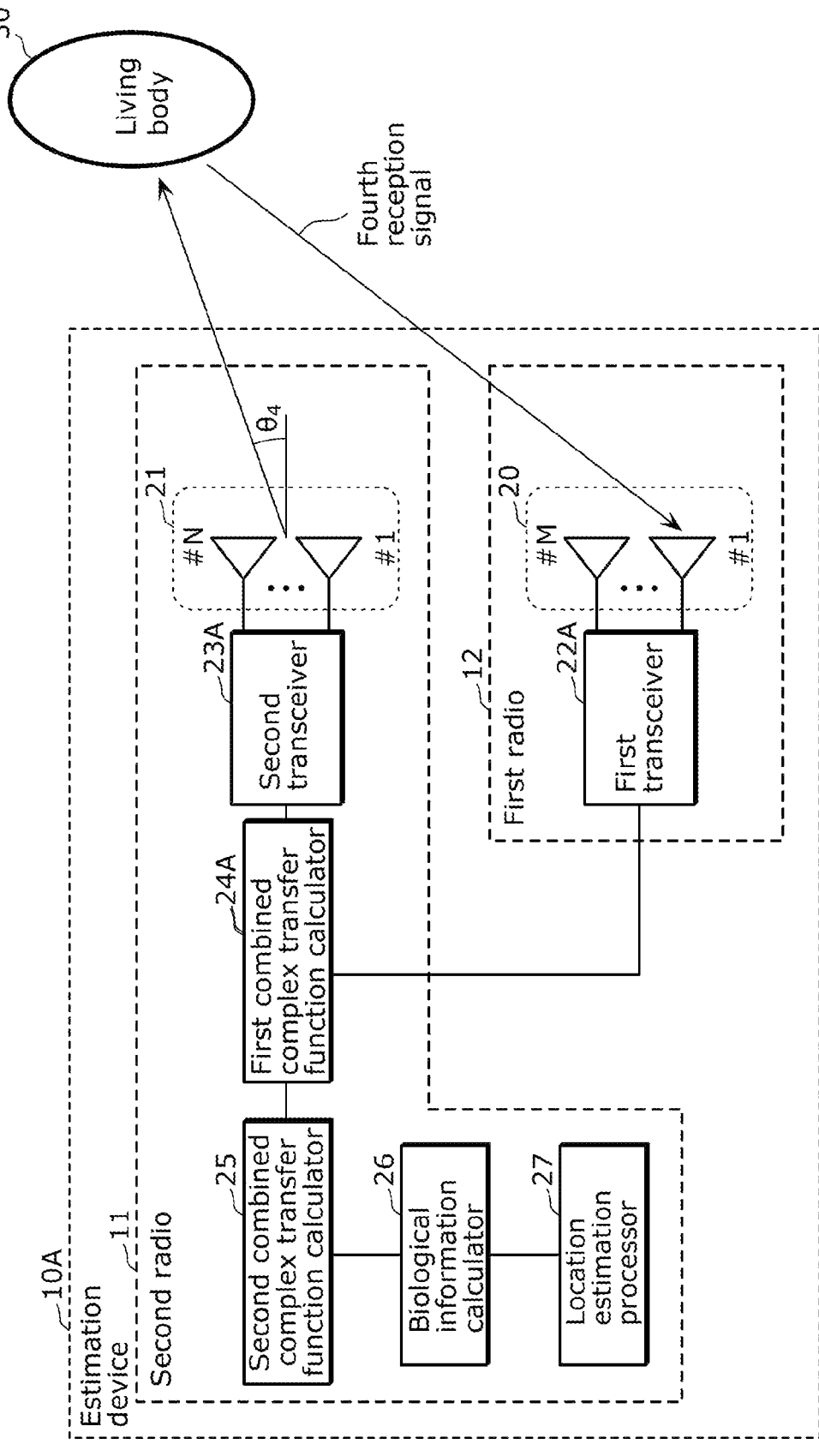
FIG. 7 is a block diagram illustrating an example of the configuration of the estimation device and an example of the detection target, according to Embodiment 2.

FIG. 6 and FIG. 7 are each a block diagram illustrating an example of the configuration of estimation device 10A according to the present embodiment. Structural components identical to those illustrated in FIG. 1 are assigned the same reference marks as in FIG. 1, and detailed description is omitted. Unless otherwise specified, the structural components identical to those according to Embodiment 1 perform the same operations and have the same variations as in Embodiment 1. Thus, these structural components are not described to avoid redundancy.

Estimation device 10A illustrated in FIG. 6 includes second radio 11, first radio 12, antenna 20, antenna 21, first transceiver 22A, second transceiver 23A, first combined complex transfer function calculator 24A, second combined complex transfer function calculator 25, biological information calculator 26, and location estimation processor 27. Estimation device 10A estimates the direction of living body 30 relative to estimation device 10A.

FIG. 6 illustrates that estimation device 10A, which includes first radio 12 having M antenna elements and second radio 11 having N antenna elements, obtains CSI (corresponding to outgoing CSI) when first radio 12 transmits a known signal to second radio 11. FIG. 7 illustrates that estimation device 10A obtains CSI (corresponding to incoming CSI) when second radio 11 transmits a known signal to first radio 12. Here, although estimation device 10A has a full MIMO configuration, the method of estimating the location of living body 30 using the MISO-based outgoing and incoming CSI obtained is described as an example.

[First Transceiver 22A]

First transceiver 22A transmits or receives predetermined signals via the M antenna elements.

At the time of signal transmission, first transceiver 22A transmits a known signal for living body estimation.

At the time of signal reception, first transceiver 22A observes a reception signal that is received by each of the N antenna elements and that includes a reflection signal reflected from living body 30 after being transmitted from the antenna element on the transmitting side. First transceiver 22A observes the reception signal for a first period corresponding to a cycle derived from an activity of living body 30.

First transceiver 22A transmits the observed reception signal, as a fourth reception signal, to first combined complex transfer function calculator 24A.

[Second Transceiver 23A]

Second transceiver 23A observes a reception signal that is received by each of the N antenna elements and that includes a reflection signal reflected from living body 30 after being transmitted from the antenna element on the transmitting side. Second transceiver 23A observes the reception signal for a first period corresponding to a cycle derived from an activity of living body 30.

Second transceiver 23A transmits the observed reception signal, as a third reception signal, to first combined complex transfer function calculator 24A.

To be more specific, when using the MISO-based CSI, first transceiver 22A transmits a known signal for CSI acquisition from the M antenna elements included in antenna 20. A predetermined one antenna element included in antenna 21 of second radio 11 receives the signal reflected from living body 30. Second transceiver 23A transmits the received signal, as the third reception signal, to first combined complex transfer function calculator 24A.

Furthermore, second transceiver 23A transmits a known signal for CSI acquisition from the N antenna elements included in antenna 21. A predetermined one antenna element included in antenna 20 of first radio 12 receives the signal transmitted and then reflected from living body 30. First transceiver 22A transmits the received signal, as the fourth reception signal, to first combined complex transfer function calculator 24A.

[First Combined Complex Transfer Function Calculator 24A]

First combined complex transfer function calculator 24A calculates, from the third reception signal and the fourth reception signal, a plurality of complex transfer functions representing propagation characteristics between first radio 12 and second radio 11.

First combined complex transfer function calculator 24A calculates the complex transfer functions representing the propagation characteristics between first radio 12 and second radio 11, from the low-frequency third reception signal and fourth reception signal transmitted from first transceiver 22A and second transceiver 23A.

Hereafter, acquisition of the outgoing CSI is described.

In this case, first combined complex transfer function calculator 24A is able to calculate a third complex transfer function vector that represents the propagation characteristics between the antenna element on the transmitting side and the array antenna on the receiving side, based on a third reception signal vector observed using the array antenna. The third reception signal vector is expressed as below.

[Math. 20]

$$x = [x_1 \ \dots \ , x_N]$$

Third complex transfer function vector $h_F$ is calculated from the following expressions, for example.

[Math. 21]

$$h_F = x/s$$

[Math. 22]

$$h_F = [h_{F11} \ \ldots \ , h_{F1N}]$$

Next, acquisition of the incoming CSI is described.

As with the incoming CSI, first combined complex transfer function calculator 24A is able to calculate a fourth complex transfer function vector that represents the propagation characteristics between the antenna element on the transmitting side and the array antenna on the receiving side, based on a fourth reception signal vector observed using the array antenna. The fourth reception signal vector is expressed as below.

[Math. 23]

$$x = [x_1 \ \ldots \ , x_M]$$

Fourth complex transfer function vector $h_B$ is calculated from the following expressions, for example.

[Math. 24]

$$h_B = x/s$$

[Math. 25]

$$h_B = [h_{B11} \ \ldots \ , h_{BM1}]^T$$

Here, $h_{F11}$ and $h_{B11}$ are the same value originally (in other words, by design). However, their phases are different due to a clock frequency error, a power error, or acquisition time difference. Thus, after one of the phases is matched to the other, the channels are combined (or more specifically, the first complex transfer function vector and the second complex transfer function vector are combined) as described below.

More specifically, using a first element of a third transmission signal and a first element of a fourth transmission signal, first combined complex transfer function calculator 24A matches one of the phases of the first complex transfer function calculated from a plurality of third reception signals and the second complex transfer function calculated from a plurality of fourth reception signals to the other. After this, by combining the first complex transfer function and the second complex transfer function, first combined complex transfer function calculator 24A calculates the first combined complex transfer function.

[Math. 26]

$$h'_B(t) = h_B \times \frac{h_{F11}}{h_{B11}} = (h'_{B11}, \ \ldots \ , h'_{BM1})^T$$

Thus, SIMO-based first combined complex transfer function vector h(t) is expressed as below.

[Math. 27]

$$h(t) = (h'_{B11}, \ \ldots \ , h'_{BM1}, h_{F12}, \ \ldots \ h_{F1N})^T$$

Furthermore, first combined complex transfer function vector h(t) includes frequency fluctuation components originating from a transmitter and a receiver and a Doppler shift originating from living body 30. The frequency fluctuation components originating from the transmitter and the receiver may be removed by the same method as described in Embodiment 1. After this removal, the location of living body 30 is estimated by the same method as described in Embodiment 1.

[Advantageous Effects Etc]

Estimation device 10A and the estimation method according to the present embodiment are capable of estimating the direction of living body 30 by combining, even if MISO-based, outgoing CSI and incoming CSI.

To verify the effects of the present embodiment, an evaluation was made through an experiment. The following describes the experiment.

[Experiment]

Figure 8:
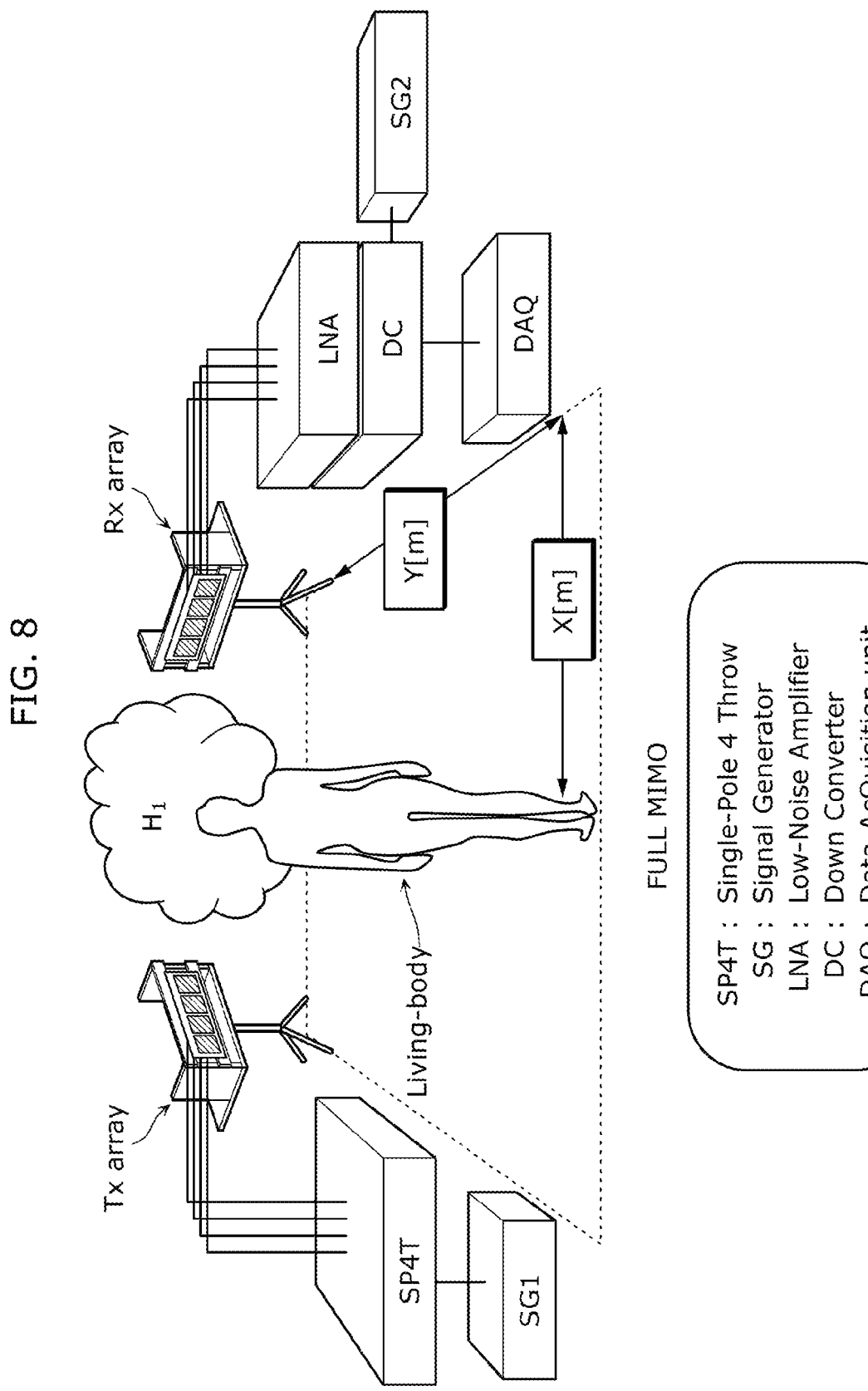
FIG. 8 is a conceptual diagram illustrating an experiment performed using an estimation method according to Embodiment 2.

FIG. 8 is a conceptual diagram illustrating a simulation experiment performed using the estimation method according to the present embodiment. FIG. 9 is a diagram illustrating conditions of the experiment performed using the estimation method according to the present embodiment.

A transmitting array antenna (Tx antenna) and a receiving array antenna (Rx array) each have a 4-by-4 MIMO (Multiple Input Multiple Output) configuration that includes a 4-element patch array antenna. Furthermore, a single-pole-4-throw (SP4T) switch is provided on the transmitting side and a 4-channel receiver is provided on the receiving side.

In the present experiment, MIMO channel measurement was performed using these devices.

As illustrated in FIG. 9, the array element spacing of the transmitting and receiving antennas was 0.5 wavelength, distance D between the transmitter and the receiver was 4.0 m, and antenna height h was 1.0 m corresponding to the chest height of a standing person (living body). The transmitter transmitted an unmodulated continuous wave (CW) at 2.47125 GHZ. The channel measure time was 33 seconds. At the time of channel measurement, only a target subject was present. The target subject was facing the wall on the antenna side.

FIG. 10 is a diagram illustrating simulation results obtained by the estimation method according to Embodiment 2. In FIG. 10, (a) illustrates a simulation result obtained by a conventional method that uses the full-MIMO-based CSI, and (b) illustrates a simulation result obtained by a conventional method that uses the SIMO-based CSI.

FIG. 10 illustrates the results of the living-body location estimation when two target subjects were present in the space. In the experiment, target subject 1 was standing at the location expressed as X=0.4 m and Y=1.8 m. Furthermore, target subject 2 was standing at the location expressed as X=3.2 m and Y=3.0 m.

In (a) and (b) of FIG. 10, the actual locations of the target subjects are indicated by x marks. Furthermore, MUSIC spectrum P (see Expression 2) is displayed in grayscale for each of the locations in the space. The target subject is estimated to be present in the location fading to black.

The probability of presence of each target subject in its location in the space using the SIMO-based CSI in (b) of FIG. 10 is substantially equal to the probability obtained in (a) of FIG. 10. Thus, the location of the living body can be estimated by the estimation method according to Embodiment 2 using the SIMO-based CSI as in (b) of FIG. 10.

Figure 11:
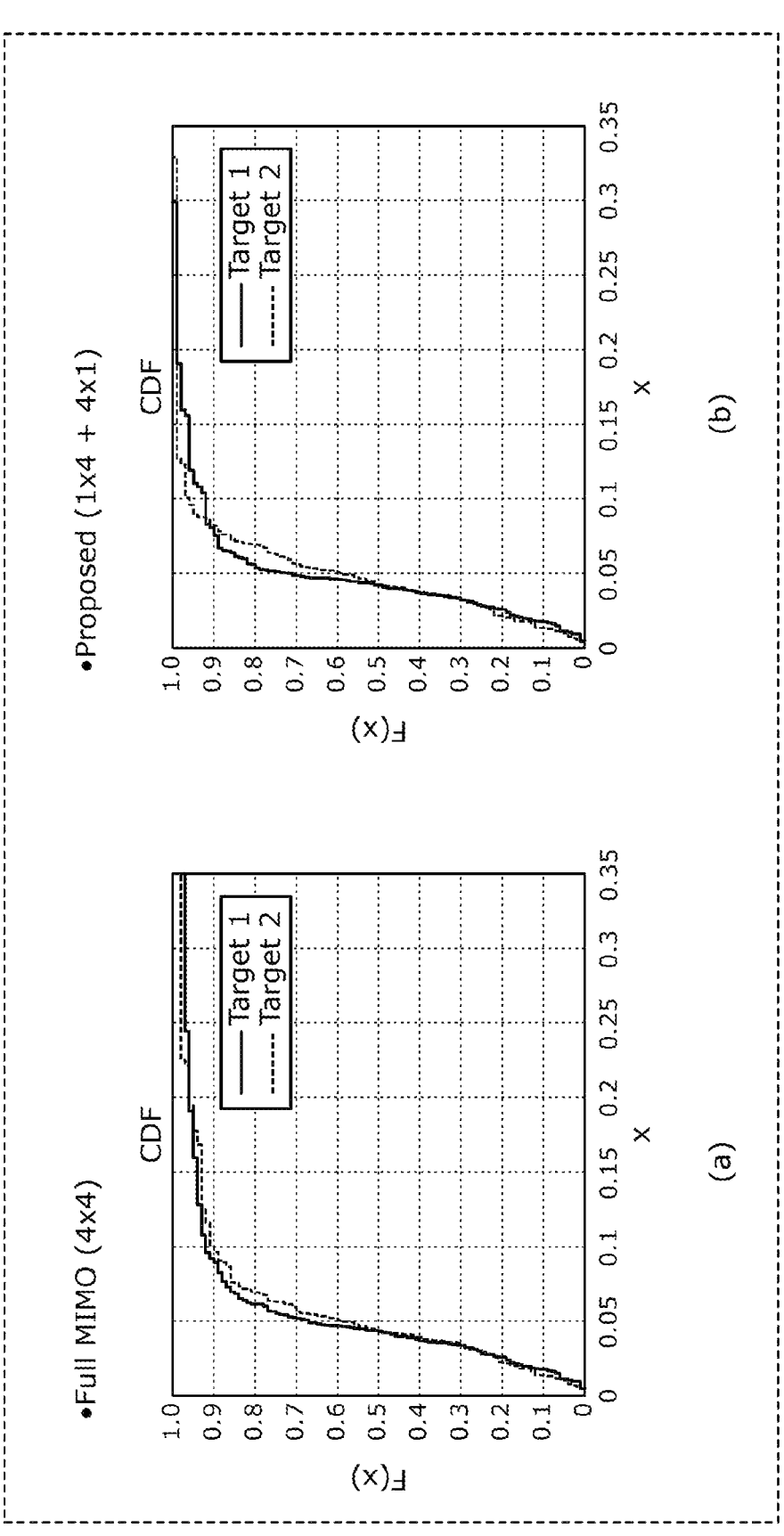
FIG. 11 is a diagram illustrating results of another experiment performed using the estimation method according to Embodiment 2.

FIG. 11 is a diagram illustrating results of another experiment performed using the estimation method according to Embodiment 2. FIG. 11 illustrates cumulative distribution functions (CDFs) of location estimation error for two target subjects. In FIG. 11, the horizontal axis represents the location estimation error (unit: m) and the vertical axis represents CDF for the location estimation error. In FIG. 11, (a) illustrates the CDF obtained using the full-MIMO-based CSI, and (b) illustrates the CDF obtained using the SIMO-based CSI.

FIG. 11 indicates that the CDF value for the location estimation error of 0.1 m is 0.91, meaning that 91% is within the error of 0.1 m. Thus, the estimation method according to Embodiment 2 enables accurate estimation as with the conventional method using the full-MIMO-based CSI. Hence, it is determined from the present embodiment that the location of the living body can be estimated with high accuracy using the SIMO-based CSI.

As described thus far, the present disclosure enables the estimation of the direction of the living body by obtaining and combining, even if MISO-based, outgoing CSI and incoming CSI and then similarly processing the frequency error.

The estimation device and the estimation method according to aspects of the present disclosure have been described above on the basis of the embodiments, but the present disclosure is not limited to these embodiments. The present disclosure also includes a variation achieved by making various modifications to the embodiments that can be conceived by those skilled in the art without departing from the essence of the present disclosure and an embodiment achieved by combining elements included in different embodiments.

For example, the estimation of the direction or the location of living body 30 has been described according to Embodiments 1 and 2. However, the estimation processing target is not limited to living body 30. The estimation processing target can be any different kind of living body (such as a machine) that causes, in response to transmission of a high-frequency signal, a Doppler effect to a reflected wave because of its activity or motion.

It should be noted that the present disclosure can be implemented not only as an estimation device that includes such characteristic elements, but also as an estimation method, etc. that includes as its steps the characteristic elements included in the estimation device and as a computer program that causes a computer to execute these characteristic steps included in the method. Such computer program can be distributed in a non-transitory computer-readable recording medium such as a CD-ROM, or via a communication network such as the Internet.

INDUSTRIAL APPLICABILITY

The present disclosure is applicable to an estimation device that estimates the direction and the location of a living body using radio signals. In particular, the present disclosure is applicable to an estimation device included in, for example: a measurement device that measures the direction and the location of a living body, including a living body and a machine; a home electrical appliance that performs control in accordance with the direction and the location of a living body; or a monitoring device that detects a living-body intrusion.

REFERENCE SIGNS LIST

10, 10A estimation device
11 second radio
12 first radio
20, 21 antenna
22, 22A first transceiver
23, 23A second transceiver
24, 24A first combined complex transfer function calculator
25 second combined complex transfer function calculator
26 biological information calculator
27 location estimation processor
30 living body

The invention claimed is:

1. An estimation method executed by an estimation device that includes: a first radio including a first antenna including M first antenna elements, where M is a natural number greater than or equal to two; and a second radio including a second antenna including N second antenna elements, where N is a natural number greater than or equal to two, the estimation method comprising:

transmitting, using one first antenna element among the M first antenna elements, a first transmission signal multiple times to a measurement target region;

observing a plurality of first reception signals that are received by the N second antenna elements and that include reflection signals reflected from a living body as a result of multiple transmissions of the first transmission signal, for a first period corresponding to a cycle of motion of the living body;

transmitting, using one second antenna element among the N second antenna elements, a second transmission signal multiple times to a measurement target region;

observing a plurality of second reception signals that are received by the M first antenna elements and that include reflection signals reflected from the living body as a result of multiple transmissions of the second transmission signal, for the first period;

calculating a first combined complex transfer function representing propagation characteristics between the M first antenna elements and the N second antenna elements, based on the plurality of first reception signals and the plurality of second reception signals observed for the first period, the first combined complex transfer function comprising a plurality of first combined complex transfer functions;

calculating a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions;

calculating biological information corresponding to a predetermined frequency range of the plurality of second combined complex transfer functions, the predetermined frequency range corresponding to a component related to the living body; and estimating one of a direction and a location of the living body, by using the biological information according to a predetermined direction-of-arrival estimation method.

2. The estimation method according to claim 1,
wherein the calculating of the plurality of first combined complex transfer functions is performed
by combining a first complex transfer function calculated from the plurality of first reception signals and a second complex transfer function calculated from the plurality of second reception signals, after matching one of phases of the first complex transfer function and the second complex transfer function to another using a first element of the first transmission signal and a first element of the second transmission signal.

3. The estimation method according to claim 2,
wherein the calculating the second combined complex transfer function includes
performing a predetermined calculation using at least one element of the first combined complex transfer function to reduce, from the first combined complex transfer function, a component corresponding to at least one of:
(1) clock jitter between a transmitter that generates a transmission signal to be transmitted from an antenna and a receiver; or
(2) timing jitter in one of: digital-to-analog conversion of the transmission signal; and
analog-to-digital conversion of one of the first reception signal and the second reception signal.

4. The estimation method according to claim 3,
wherein the calculating the second combined complex transfer function includes
extracting one element from the first combined complex transfer function and dividing all elements of the first combined complex transfer function by the one element extracted.

5. The estimation method according to claim 3,
wherein the calculating the second combined complex transfer function includes
calculating an average value of all elements of the first combined complex transfer function and dividing the all elements of the first combined complex transfer function by the average value calculated.

6. The estimation method according to claim 3,
wherein the calculating the second combined complex transfer function includes:
calculating a correlation matrix of the first combined complex transfer function according to a predetermined method and performing eigenvalue decomposition on the correlation matrix to calculate at least one eigenvalue and at least one eigenvector corresponding to the at least one eigenvalue;
calculating a third complex transfer function, which is a channel component of a direct wave, by multiplying the first combined complex transfer function by an eigenvector that, among the at least one eigenvector calculated, corresponds to a largest eigenvalue among the at least one eigenvalue calculated; and
dividing all elements of the first combined complex transfer function by the third complex transfer function.

7. The estimation method according to claim 3,
wherein the calculating the second combined complex transfer function includes:
calculating a fourth complex transfer function, which is a channel component of a direct wave, by multiplying the first combined complex transfer function by a left singular vector and a right singular vector that are obtained by performing singular value decomposition on the first combined complex transfer function according to a predetermined method; and
dividing all elements of the first combined complex transfer function by the fourth complex transfer function.

8. The estimation method according to claim 1,
wherein the calculating the second combined complex transfer function includes
performing phase correction on the first transmission signal and the second transmission signal using a first element of the first transmission signal and a first element of the second transmission signal to remove one of phase rotations of the first transmission signal and the second transmission signal with respect to another.

9. The estimation method according to claim 1,
wherein the predetermined direction-of-arrival estimation method is based on at least one of a multiple signal classification (MUSIC) method, a beamformer method, or a Capon method.

10. The estimation method according to claim 1,
wherein one of the first reception signal and the second reception signal is an orthogonal frequency division multiplexing (OFDM) modulated signal.

11. An estimation method executed by an estimation device that includes: a first radio including a first antenna including M first antenna elements, where M is a natural number greater than or equal to two; and a second radio including a second antenna including N second antenna elements, where N is a natural number greater than or equal to two, the estimation method comprising:
transmitting, using each of the M first antenna elements, a first transmission signal multiple times to a measurement target region;
observing a plurality of third reception signals that are received by one second antenna element among the N second antenna elements and that include reflection signals reflected from a living body as a result of multiple transmissions of the first transmission signal, for a first period corresponding to a cycle of motion of the living body;
transmitting, using each of the N second antenna elements, a second transmission signal multiple times to a measurement target region;
observing a plurality of fourth reception signals that are received by one first antenna element among the M first antenna elements and that include reflection signals reflected from the living body as a result of multiple transmissions of the second transmission signal, for the first period;
calculating a first combined complex transfer function representing propagation characteristics between the M first antenna elements and the N second antenna elements, based on the plurality of third reception signals and the plurality of fourth reception signals observed for the first period, the first combined complex transfer function comprising a plurality of first combined complex transfer functions;
calculating a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions;

calculating biological information corresponding to a predetermined frequency range of the plurality of second combined complex transfer functions, the predetermined frequency range corresponding to a component related to the living body; and estimating one of a direction and a location of the living body using the biological information according to a predetermined direction-of-arrival estimation method.

12. The estimation method according to claim 11, wherein the calculating the first combined complex transfer function includes combining a first complex transfer function calculated from the plurality of third reception signals and a second complex transfer function calculated from the plurality of fourth reception signals, after matching one of phases of the first complex transfer function and the second complex transfer function to another using a first element of the third reception signal and a first element of the fourth reception signal.

13. The estimation method according to claim 12, wherein the calculating the second combined complex transfer function includes performing a predetermined calculation using at least one element of the first combined complex transfer function to reduce, from the first combined complex transfer function, a component corresponding to at least one of:

(1) clock jitter between a transmitter that generates a transmission signal to be transmitted from an antenna and a receiver; or (2) timing jitter in one of: digital-to-analog conversion of the transmission signal; and analog-to-digital conversion of one of the third reception signal and the fourth reception signal.

14. The estimation method according to claim 11, wherein the calculating the second combined complex transfer function includes performing phase correction on the third reception signal and the fourth reception signal using a first element of the third reception signal and a first element of the fourth reception signal to remove one of phase rotations of the third reception signal and the fourth reception signal with respect to another.

15. The estimation method according to claim 11, wherein one of the third reception signal and the fourth reception signal is an orthogonal frequency division multiplexing (OFDM) modulated signal.

16. An estimation device comprising:

a first radio including a first antenna including M first antenna elements, where M is a natural number greater than or equal to two; and a second radio including a second antenna including N second antenna elements, where N is a natural number greater than or equal to two, wherein the first radio causes one first antenna element among the M first antenna elements to transmit a first transmission signal multiple times to a measurement target region;

the second radio observes a plurality of first reception signals that are received by the N second antenna elements and that include reflection signals reflected from a living body as a result of multiple transmissions of the first transmission signal, for a first period corresponding to a cycle of motion of the living body;

the second radio causes one second antenna element among the N second antenna elements to transmit a second transmission signal multiple times to a measurement target region;

the first radio observes a plurality of second reception signals that are received by the M first antenna elements and that include reflection signals reflected from the living body as a result of multiple transmissions of the second transmission signal, for the first period; and the estimation device further comprising:

a first combined complex transfer function calculator that calculates a first combined complex transfer function representing propagation characteristics between the M first antenna elements and the N second antenna elements, based on the plurality of first reception signals and the plurality of second reception signals observed for the first period, the first combined complex transfer function comprising a plurality of first combined complex transfer functions;

a second combined complex transfer function calculator that calculates a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions;

a biological information calculator that extracts biological information corresponding to a predetermined frequency range of the plurality of second combined complex transfer functions, the predetermined frequency range corresponding to a component related to the living body; and a location estimation processor that estimates one of a direction and a location of the living body using the biological information according to a predetermined direction-of-arrival estimation method.

17. An estimation device comprising:

a first radio including a first antenna including M first antenna elements, where M is a natural number greater than or equal to two; and a second radio including a second antenna including N second antenna elements, where N is a natural number greater than or equal to two, wherein the first radio causes each of the M first antenna elements to transmit a first transmission signal multiple times to a measurement target region, the second radio observes a plurality of third reception signals that are received by one second antenna element among the N second antenna elements and that include reflection signals reflected from a living body as a result of multiple transmissions of the first transmission signal, for a first period corresponding to a cycle of motion of the living body, the second radio causes each of the N second antenna elements to transmit a second transmission signal multiple times to a measurement target region, the first radio observes a plurality of fourth reception signals that are received by one first antenna element among the M first antenna elements and that include reflection signals reflected from the living body as a result of multiple transmissions of the second transmission signal, for the first period, and the estimation device further comprising:

a first combined complex transfer function calculator that calculates a first combined complex transfer function representing propagation characteristics between the M first antenna elements and the N second antenna elements, based on the plurality of third reception signals and the plurality of fourth reception signals observed for the first period, the first combined complex transfer function comprising a plurality of first combined complex transfer functions;

a second combined complex transfer function calculator that calculates a second combined complex transfer function by performing a calculation on the plurality of first combined complex transfer functions according to a predetermined method to reduce effects caused by a clock frequency error and a transmission power error between the first radio and the second radio, the second combined complex transfer function comprising a plurality of second combined complex transfer functions;

a biological information calculator that extracts biological information corresponding to a predetermined frequency range of the plurality of second combined complex transfer functions, the predetermined frequency range corresponding to a component related to the living body; and a location estimation processor that estimates one of a direction and a location of the living body using the biological information according to a predetermined direction-of-arrival estimation method.

* * * * *